United States Patent [19]

Kondo et al.

[11] 4,304,097
[45] Dec. 8, 1981

[54] EXHAUST GAS VENT VALVE DEVICE FOR EXHAUST GAS DRIVEN TURBOCHARGER

[75] Inventors: Nobuhiro Kondo, Matsudo; Hideaki Matsuoka, Zama, both of Japan

[73] Assignee: Ishikawajima-Harima Jukogyo Kabushiki Kaisha, Tokyo, Japan

[21] Appl. No.: 57,719

[22] Filed: Jul. 16, 1979

[30] Foreign Application Priority Data

Jul. 25, 1978 [JP] Japan ............... 53/102031[U]

[51] Int. Cl.³ ............................................. F02B 37/12
[52] U.S. Cl. ............................................................ 60/602
[58] Field of Search ............... 60/600, 601, 602, 603; 415/144, 145; 417/407

[56] References Cited

U.S. PATENT DOCUMENTS

| | | | |
|---|---|---|---|
| 3,044,683 | 7/1962 | Woolenweber | 60/606 X |
| 3,102,382 | 9/1963 | Bozzola | 60/602 |
| 3,195,805 | 7/1965 | Cholvin et al. | 60/602 |
| 3,233,403 | 2/1966 | MacInnes et al. | 60/600 |
| 3,270,951 | 9/1966 | Reed | 60/602 X |
| 4,084,378 | 4/1978 | Blake | 60/602 |
| 4,120,156 | 10/1978 | McInerney | 60/602 |
| 4,171,936 | 10/1979 | Hageman et al. | 60/602 X |

FOREIGN PATENT DOCUMENTS

| | | | |
|---|---|---|---|
| 2745153 | 4/1979 | Fed. Rep. of Germany | 60/602 |
| 1187919 | 3/1959 | France | 60/602 |

*Primary Examiner*—Michael Koczo, Jr.
*Attorney, Agent, or Firm*—Alfred E. Miller

[57] ABSTRACT

A housing of a turbine of an exhaust gas driven turbocharger has a bypass passage which intercommunicates between an exhaust gas induction passage for directing the exhaust gases from an engine into a turbine wheel chamber and a turbine exhaust passage for discharging the exhaust gases. Disposed in the bypass passage is a valve body which normally closes the bypass passage but opens it so as to cause part of the exhaust gases to bypass the turbine when the pressure of the air delivered from a compressor exceeds a predetermined level.

2 Claims, 2 Drawing Figures

EXHAUST GAS VENT VALVE DEVICE FOR EXHAUST GAS DRIVEN TURBOCHARGER

BACKGROUND OF THE INVENTION

The present invention relates to an exhaust gas vent valve for an exhaust gas driven turbocharger.

With the exhaust gas driven turbochargers mounted on the internal combustion engines of automobiles, construction machines or the like, the exhaust gases from the engine drives a turbine which in turn drives the blower of a compressor disposed in coaxial relationship with the turbine so as to increase the pressure and weight of air to be charged into the engine, thereby attaining high outputs or speeds. Because such turbochargers are driven by the exhaust gases, the rotational speed of the turbine varies linearly with the engine speed; that is, the flow rate of the exhaust gases. For instance, as the speed of the engine increases, the discharge rate of exhaust gases increases and consequently the rotational speed of the turbine rises so that the pressure of air charged into the engine exceeds a predetermined level. When the air under abnormally high pressures is charged into the engine, the combustion pressures increase, resulting in damages to cylinders and a connecting rod. In order to overcome these problems, the turbochargers are in general equipped with an exhaust gas vent valve for controlling the flow rate of the exhaust gases flowing from the exhaust manifold of the engine into the turbine so that the discharge pressure of the compressor will not exceed a predetermined level. Especially the exhaust gas driven turbochargers are equipped with the exhaust gas vent valve of the type described above in order to improve the torque characteristics of the engine.

In FIG. 1 is shown a conventional exhaust gas driven turbocharger 2. The exhaust gases from an internal combustion engine 1 flow through an engine exhaust pipe 4 into a turbine wheel chamber 3 so as to drive a turbine wheel 5 and is discharged through a turbine exhaust pipe 6 to the surrounding atmosphere. As the turbine wheel 5 is driven, a blower wheel 7 of a compressor 8 which is also carried by the shaft of the turbine wheel 5 is rotated and the pressurized air flows from an outlet port 9 through an induction pipe 10 into the engine 1.

As described above, an exhaust gas vent valve 11 has a function of controlling the pressure of air to be charged into the engine 1 by the compressor 8 so as to prevent the air pressure from rising above a predetermined level. To this end, a bypass pipe 12 is provided to connect the engine exhaust pipe 4 with the turbine exhaust pipe 6 through the exhaust gas vent valve 11. An exhaust gas passage 15 having an inlet 13 and an outlet 14 is formed in the exhaust gas vent valve 11 and communicates with the bypass line 12. A valve body 16 is disposed at the inlet 13 so as to open and close the exhaust gas passage 15.

The exhaust gas vent valve 11 has a diaphragm housing 19 which is divided by a diaphragm 18 into a pressure chamber 20 and an atmospheric pressure chamber 21. The valve stem 17 of the valve body 16 is connected to the diaphragm 18. The pressure chamber 20 communicates through an inlet port 22 and a pipe line with the air induction pipe 10 so that the pressure at the discharge port 9 of the compressor 8 may be transmitted into the pressure chamber 20. The atmospheric pressure chamber 21 communicates through ports with the surrounding atmosphere, and a coiled spring 23 is loaded in the atmospheric pressure chamber 21 between the end wall thereof and the diaphragm 18. The force or spring constant of the coiled spring 23 is so selected that unless the pressure at the discharge port 9 of the compressor 8 exceeds a predetermined level the diaphragm 18 will not be permitted to deflect itself toward the atmospheric pressure chamber 21. That is, as far as the discharge pressure of the compressor 8 is below a predetermined level, the diaphragm 18 remains in such a position that the valve body 16 closes the inlet 13 of the exhaust passage 15. However, when the discharge pressure exceeds a predetermined level, the diaphragm 18 is deflected toward the atmospheric pressure chamber 21 so that the valve body 16 is moved away from its seat to open the inlet 13. As a result, part of the exhaust gases may bypass the turbine wheel chamber 3 so that the rotational speed of the turbine wheel 5 drops and consequently the discharge pressure of the compressor 8 decreases.

The exhaust gas vent valve 11 is fabricated separately from the turbocharger 2 and must communicate with the engine exhaust pipe 4 and the turbine exhaust pipe 6 through the bypass pipe 12 and with the air induction pipe 10 through the pressure transmission line. That is, when the exhaust vent valve 11 is mounted on the engine 1, an additional piping system must be provided to communicate the exhaust vent valve 11 with the engine exhaust pipe 4, the turbine exhaust pipe 6 and the air induction pipe 10. As a result, the engine is inevitably increased both in weight and volume so that a large engine space is required, the outer appearance is degraded and the overall weight of an automobile or a construction machine is increased.

The present invention was made to overcome the above and other problems encountered in the prior art exhaust gas driven turbochargers.

One of the objects of the present invention is therefore to provide an exhaust gas vent valve system for controlling the flow rate of exhaust gases flowing into a turbine of an exhaust gas driven turbocharger which may be fabricated as a unitary assembly with the turbocharger or may be directly mounted on it, whereby the exhaust gas driven turbocharger may be made compact in size and light in weight.

The present invention will become apparent from the following description of one preferred embodiment thereof taken in conjunction with the accompanying drawings.

DETAILED DESCRIPTION OF THE PREFERRED EMBODIMENT

Figure 2:
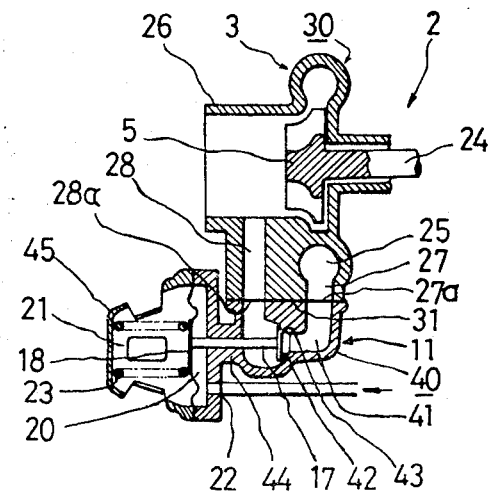
FIG. 2 is a longitudinal sectional view of an exhaust gas vent valve system in accordance with the present invention for an exhaust gas driven turbocharger.

A compressor is not shown in FIG. 2 for the sake of simplicity, but it is to be understood that a compressor wheel is also carried by a combined turbine and compressor shaft 24. A turbine wheel chamber 3 has a housing 30 which is formed with a volute exhaust gas induction passage 25 and a cylindrical turbine exhaust opening 26. The turbine housing 30 may be fabricated by casting. A turbine wheel 5 carried by the combined turbine and compressor shaft 24 is disposed within the volute casing portion. The volute passage 25 communicates with a first passage 27 which extends radially outwardly while the turbine exhaust outlet 26 communicates with a second passage 28 which also extends radially outwardly. The passages 27 and 28 extend in parallel with each other, and their outer openings 27a and 28a are opened at a flat mounting surface 31 of the housing 30 and are spaced apart from each other by a suitable distance.

An exhaust gas vent valve device 11 is permanently or removably mounted on the housing 30 and communicates with the open ends 27a and 28a of the bypass passages 27 and 28 in the turbine housing 30 as will be described in detail below.

Figure 1:
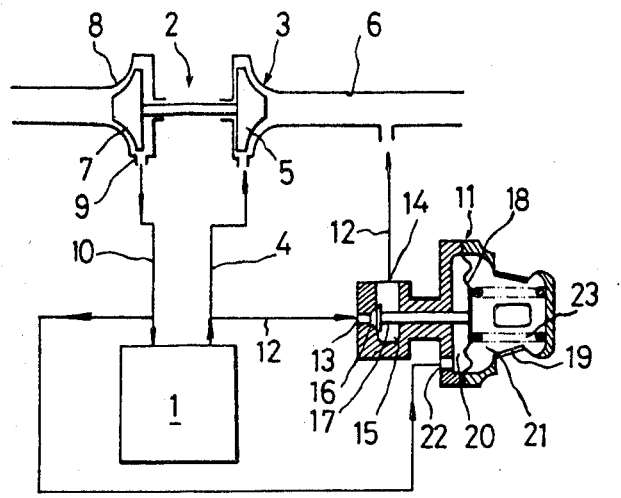
FIG. 1 is a diagrammatic view of an prior art exhaust gas driven turbocharger.

The vent valve device 11 has a valve housing 40 and a diaphragm housing 45 which is so joined to the former with a diaphragm 18 interposed therebetween that a pressure chamber 20 and an atmospheric pressure chamber 21 may be defined as in the prior art vent valve device shown in FIG. 1. The pressure chamber 20 communicates through a port 22 with the discharge port of the compressor. In the atmospheric pressure chamber 21 which communicates with the surrounding atmosphere through ports, a coiled spring 23 is loaded between the end wall of the diaphragm housing 45 and the diaphragm 18. The force or spring constant of the coiled spring 23 is so selected that when the pressure in the pressure chamber 20 and hence the discharge pressure of the compressor exceeds a predetermined level, the diaphragm 18 is deflected to the left or toward the atmospheric pressure chamber 21.

The valve housing 40 is formed with an almost nearly U-shaped bypass passage 41 having one open end adapted to mate with the open end 27a of the passage 27 in the turbine housing 30 and the other open end adapted to be joined to the open end 28a of the bypass passage 28.

The horizontal portion of the U-shaped bypass passage 41 is slightly enlarged in diameter to provide a valve seat 43 for a valve body 42 which is connected to the diaphragm 18 with a valve stem 17 extending through a neck 44.

Next the mode of operation of the exhaust gas vent valve device 11 with the above construction will be described. Normally the valve body 42 is pressed against the valve seat 43 under the force of the coiled spring 23 so that all the exhaust gases from the engine flow into the turbine wheel chamber 3. When the discharge pressure of the compressor exceeds a predetermined level, the pressure in the pressure chamber 20 rises so that the diaphragm 18 is displaced to the left against the bias of the coiled spring 23. As a result, the valve body 42 is moved away from the valve seat 43 to open the bypass passage 41, and consequently part of the exhaust gases flow from the volute passage 25 through the passage 27, the bypass passage 41 and the passage 28 into the turbine exhaust opening 26. That is, the flow rate of the exhaust gases flowing into the turbine wheel chamber 3 is controlled to a predetermined level so that the rotational speed of the turbine wheel 5 and hence the pressure of the air delivered from the compressor to the engine may be controlled.

Since the exhaust gas vent device 11 in accordance with the present invention may be directly mounted on the turbine housing 30 which is formed with the bypass passages 27 and 28, the response to the variations in the discharge pressure of the compressor becomes very fast.

Furthermore, when the turbine housing 30 is fabricated by casting, the bypass passages 27 and 28 may be used for supporting a core or may be inserted with supports for the core. As a result, the dimensional accuracies may be considerably improved and the yield may be remarkably increased so that the fabrication or casting costs of the turbine housings may be considerably reduced.

The advantages of the present invention may be summarized as follows:

(1) Since the exhaust gas vent valve device may be directly mounted as an unitary assembly on the turbine housing of the exhaust gas driven turbocharger, the latter may be made compact in size.

(2) Since the exhaust gas vent valve device may be directly mounted on the turbocharger, a pipeline system for intercommunicating between the turbocharger and the exhaust gas vent valve may be eliminated. As a result, the installation space for the exhaust gas driven turbocharger with the vent valve device may be reduced and the overall weight of the turbocharger including the vent valve device may be decreased.

(3) When the turbine housings are fabricated by casting, the cores may be correctly and positively supported so that the dimensional accuracies may be improved and the fabrication cost may be reduced.

What is claimed is:

1. In an exhaust gas driven turbocharger comprising a turbine wheel chamber of said turbocharger, a housing for said chamber, an exhaust gas induction passage formed in said housing for directing the exhaust gases to the turbine wheel chamber, a turbine exhaust passage formed in said housing for discharging the exhaust gases from said turbine wheel chamber, a first bypass passage extending through the housing from said exhaust gas induction passage, a second bypass passage extending through the housing from said turbine exhaust passage, the improvement comprising an exhaust gas vent valve comprising a third U-shaped bypass passage with the ends thereof aligned with said first and second bypass passages for directly interconnecting said first and second bypass passages to form a compact structure, and a valve body disposed in said third bypass passage and responsive to variations in pressure of the air delivered from a compressor of said turbocharger so as to open and close said third bypass passage, said exhaust vent valve being directly mounted on said turbocharger and being an integral structure that can be removed from said turbocharger without affecting the operation thereof.

2. An exhaust gas vent valve device as set forth in claim 1 wherein said first and second bypass passages in said turbine housing are opened at an outer surface of said turbine housing; and a valve housing which is formed with said third bypass passage and accommodates said valve body is mounted on said turbine housing so that said third bypass passage may intercommunicate between said first and second bypass passages in said turbine housing.